Figure 1:
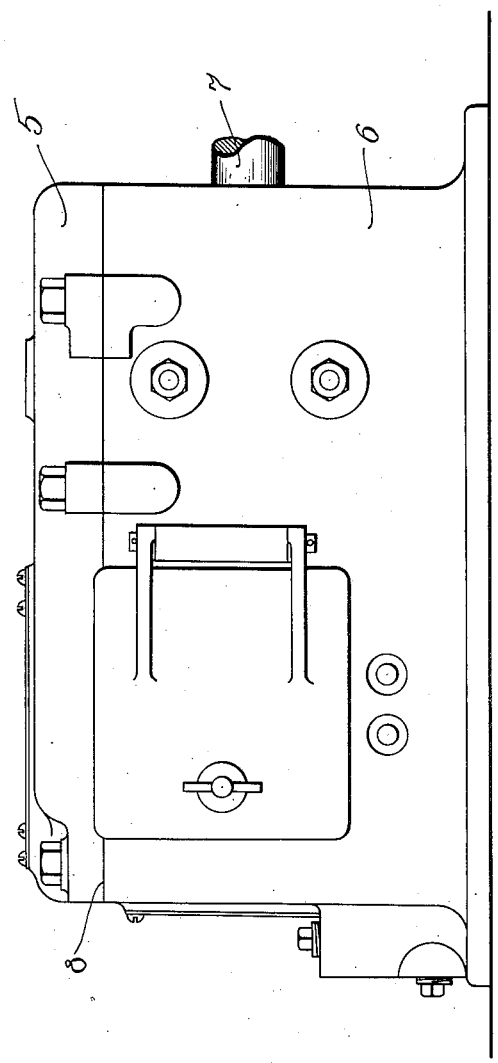

No. 893,681. PATENTED JULY 21, 1908.
W. L. WATERS.
DYNAMO ELECTRIC MACHINE.
APPLICATION FILED DEC. 13, 1906.

2 SHEETS—SHEET 1.

Witnesses:
Arthur H. Boettcher,
George C. Higham.

Inventor
William L. Waters
By Charles A. Brown
Attorney

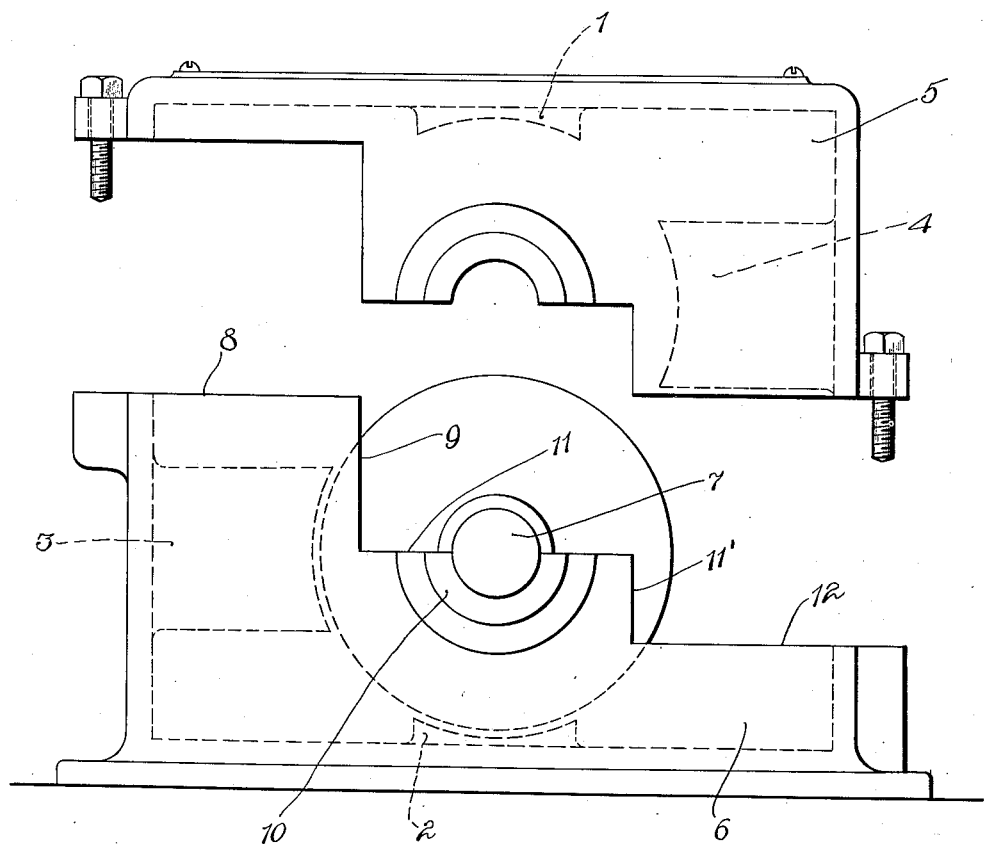

UNITED STATES PATENT OFFICE.

WILLIAM L. WATERS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

DYNAMO-ELECTRIC MACHINE.

No. 893,681.  Specification of Letters Patent.  Patented July 21, 1908.

Application filed December 13, 1906. Serial No. 347,611.

*To all whom it may concern:*

Be it known that I, WILLIAM L. WATERS, citizen of the United States, residing at Milwaukee, in the county of Milwaukee and State of Wisconsin, have invented a certain new and useful Improvement in Dynamo-Electric Machines, of which the following is a full, clear, concise and exact description, reference being had to the accompanying drawings, forming a part of this specification.

My invention relates to dynamo electric machines, having for its object improved features of construction and arrangement, particularly of the field magnet and inclosing case.

My invention is of particular importance and utility in inclosing motors or dynamos in which it is necessary to have a perfect machine fit between the top half and the lower half of the frame which incloses the armature and which supports the field poles. To obtain this perfect fit, the edges of the castings must be machined, but this in machines of the prior art is very difficult to perform, owing to the fact that the field poles and the bearings interfere with finishing the machine. I, therefore, have the line of separation between the upper and lower halves of the casting in such position that the poles and bearings will be cleared and straight uninterrupted paths offered for the finishing tools, and the arrangement of my invention will be best understood by reference to the accompanying drawings in which Figure 1 is a side view of a dynamo electric motor, and Fig. 2 is an end view, showing the upper and lower halves of the casing separated.

In this machine there are four poles, two vertical poles 1 and 2 and two horizontal poles 3 and 4. If the upper and lower halves 5 and 6 of the inclosing casing were divided on a horizontal plane passing through the axis of the armature shaft 7, the horizontal poles would be in the path of the planing or milling tools which would be used to plane the engaging edges, and a great deal of time would be consumed in finishing all the surfaces. I, therefore, have the line of division between the two halves along several planes. The line of separation runs first in horizontal plane 8 which is above the horizontal pole 3, then in vertical plane 9 which is between the pole 3 and bearing parts 10, then along the horizontal plane 11, passing through the axis, then along vertical plane 11' between the horizontal pole 4 and bearing parts 10, then horizontal plane 12 which is below the pole 4. With this construction there is nothing in the path between the opposite edges in the various planes, and each path of the casing can be laid on a machine bed and milling or planing tools can be carried straight across to practically cut and finish the edges in one operation, and the finishing of the edges, therefore, becomes a very simple matter, the edges being also true, thus insuring a tight and perfect fit when the halves are brought together. It will be noticed that the halves of the bearings are also finished during the same operation. With this separation of the parts, the upper vertical and right horizontal pole and the upper bearing halves may be cast integral with the upper section, and the lower vertical and left horizontal poles and the lower bearing section may be cast integral with the lower or base section. This arrangement is very useful in that when the top half is removed, as shown in Fig. 2, the armature shaft with the armature can very readily be inspected or lifted from the bearings.

I do not wish to limit my invention to the particular form of machine here shown, as it may be applied to machines of other construction.

I claim as new and desire to secure by Letters Patent:

1. In a dynamo electric machine, an inclosing casing composed of two sections adapted to be secured together, the line of separation between the two parts being along two vertical and three horizontal planes.

2. In a dynamo electric machine, the combination of an inclosing field frame comprising an upper and lower section opposite horizontal poles for the field frame, bearings disposed between the poles for supporting an armature shaft, the line of separation lying in three horizontal planes disposed respectively above the left pole, through the axis of the bearings, and below the right pole, and in two vertical planes disposed respectively between the left pole and the bearing, and between the right pole and the bearing.

3. In a dynamo electric machine, the combination of an inclosing field frame comprising an upper and a lower section, horizontal field poles for the frame, bearings for the armature shaft between the poles, the line of separation between the frame sections passing along a horizontal plane disposed above the left pole and along a vertical plane between the left pole and the bearings, then along a horizontal plane passing through the axis of the shaft, then in a vertical plane between the bearings and the right pole, then in a horizontal plane disposed below the right pole, the right pole and upper bearing sections being cast integral with the upper frame section and the left pole and lower bearing sections being cast integral with the lower frame section.

In witness whereof, I hereunto subscribe my name this 7th day of December A. D., 1906.

WILLIAM L. WATERS.

Witnesses:
 EDNA B. BURDICK,
 S. W. GLOVER.